United States Patent [19]

Tsuboyama et al.

[11] Patent Number: 4,902,107
[45] Date of Patent: Feb. 20, 1990

[54] FERROELECTRIC LIQUID CRYSTAL OPTICAL DEVICE HAVING TEMPERATURE COMPENSATION

[75] Inventors: Akira Tsuboyama, Tokyo; Shinjiro Okada; Osamu Taniguchi, both of Kawasaki; Masahiko Enari, Yokohama, all of Japan

[73] Assignee: Canon Kabushiki Kaisha, Tokyo, Japan

[21] Appl. No.: 352,609

[22] Filed: May 15, 1989

Related U.S. Application Data

[63] Continuation of Ser. No. 853,162, Apr. 17, 1986, abandoned.

[30] Foreign Application Priority Data

Apr. 26, 1985 [JP] Japan .................................. 60-90123
Apr. 26, 1985 [JP] Japan .................................. 60-90124

[51] Int. Cl.$^4$ ............................................. G02F 1/133
[52] U.S. Cl. .................................. 350/350 S; 350/333; 350/331 T; 340/784
[58] Field of Search ................. 350/331 T, 332, 333, 350/350 S, 337; 340/765, 784, 805, 811, 813

[56] References Cited

U.S. PATENT DOCUMENTS

| | | | |
|---|---|---|---|
| 3,907,405 | 9/1975 | Fukai et al. ...................... | 350/331 T |
| 4,045,791 | 8/1977 | Fukai et al. ...................... | 340/713 |
| 4,242,679 | 12/1980 | Mozozimi et al. ............... | 350/331 T |
| 4,462,027 | 7/1984 | Lloyd ............................... | 350/331 T |
| 4,586,039 | 4/1986 | Nonomura et al. ............... | 340/813 |
| 4,639,089 | 1/1987 | Okada et al. ..................... | 350/350 S |
| 4,655,561 | 4/1987 | Kanbe et al. ..................... | 350/333 |
| 4,659,181 | 4/1987 | Mankedick et al. ............. | 350/332 |
| 4,668,051 | 5/1987 | Mourey et al. ................... | 350/350 S |
| 4,707,078 | 11/1987 | Geary ............................... | 350/350 S |
| 4,715,688 | 12/1987 | Harada et al. .................... | 350/333 |

FOREIGN PATENT DOCUMENTS

| | | |
|---|---|---|
| 0092181 | 10/1983 | European Pat. Off. . |
| 3502160 | 7/1985 | Fed. Rep. of Germany . |
| 2554884 | 10/1984 | France . |
| 59-170819 | 9/1984 | Japan . |
| 8502237 | 5/1985 | World Int. Prop. O. .......... 350/332 |

Primary Examiner—Stanley D. Miller
Assistant Examiner—Tai Van Duong
Attorney, Agent, or Firm—Fitzpatrick, Cella, Harper & Scinto

[57] ABSTRACT

A liquid crystal device, includes: (a) a liquid crystal cell includes a pair of base plates, and a ferroelectric smectic liquid crystal having a negative dielectric anisotropy, (b) a device for applying to the ferroelectric liquid crystal an alternating electric field capable of causing the crystal to assume at least two stable orientation states including a first stable orientation state and a second stable orientation state, (c) a device for changing the frequency or voltage value of the alternating electric field corresponding to a temperature change, (d) a device for selectively applying a first electric field for orienting the ferroelectric liquid crystal to the first stable orientation state and a second electric field for orienting the ferroelectric liquid crystal to the second stable orientation state, and (e) a device for detecting an optical difference between light rays having passed through the ferroelectric liquid crystal oriented to the first orientation state and light rays having passed through the ferroelectric liquid crystal oriented to the second orientation state.

11 Claims, 10 Drawing Sheets

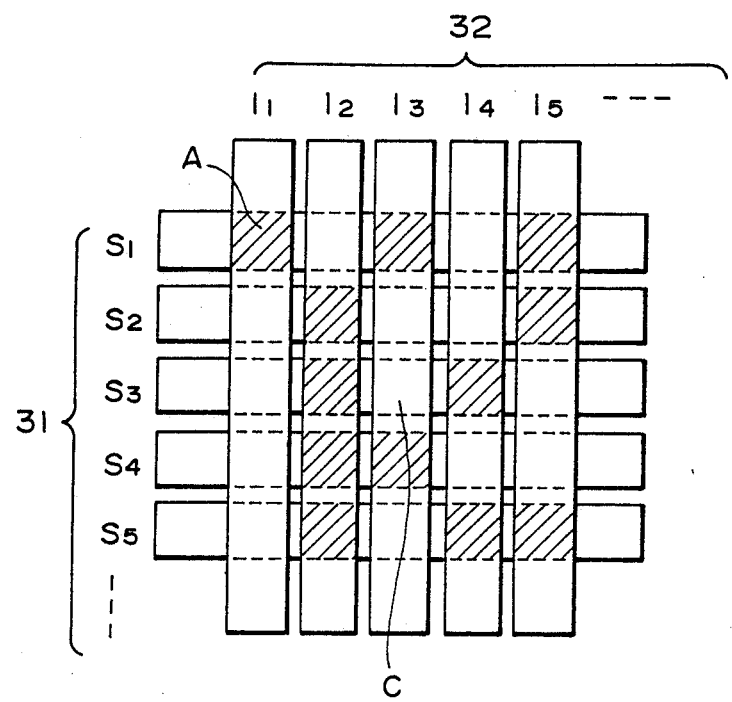
F I G. 3A (a) 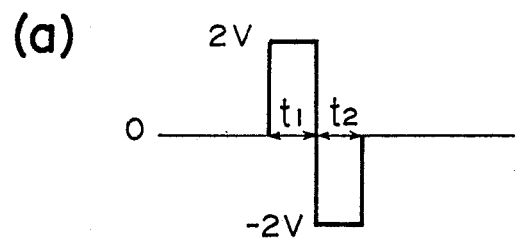
(b) 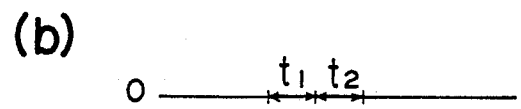
(c) 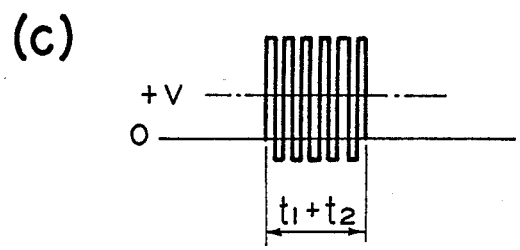
(d) 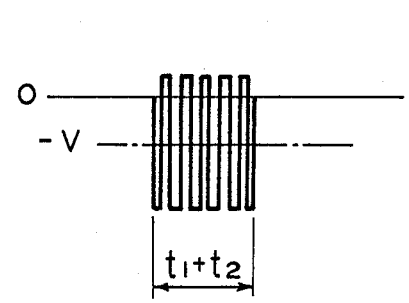
F I G. 3B (a)

(b)

(c)

(d)

(a) 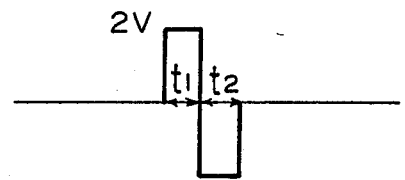
(b) 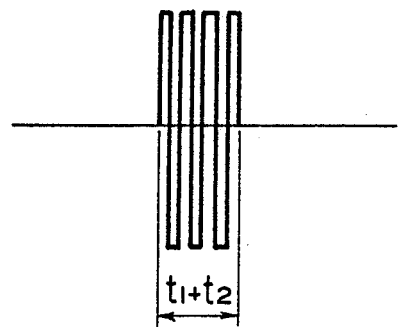
(c) 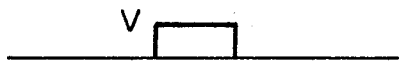
(d) 
F I G. 5

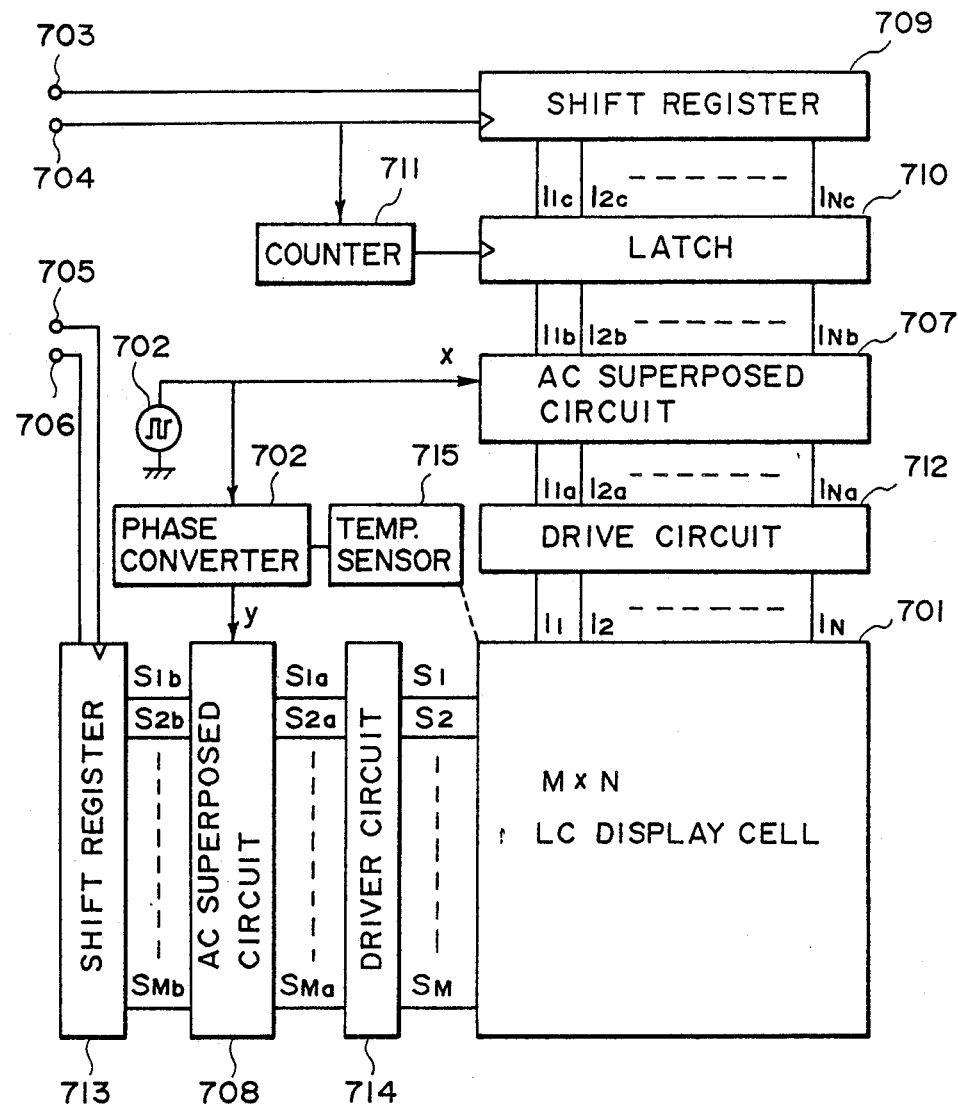
F I G. 7

FERROELECTRIC LIQUID CRYSTAL OPTICAL DEVICE HAVING TEMPERATURE COMPENSATION

This application is a continuation, of application Ser. No, 06/853,162 filed Apr. 17, 1964, now abandoned.

FIELD OF THE INVENTION AND RELATED ART

The present invention relates to a liquid crystal optical device applied to a liquid crystal display device, a liquid crystal-optical shutter array, etc., and more particularly to a liquid crystal optical device having improved display and driving characteristics.

Clark and Lagerwall have proposed a liquid crystal device wherein the transmission of light rays is controlled by utilizing the refractive index anisotropy of ferroelectric liquid crystal molecules in combination with polarizing elements (e.g., U.S. Pat. No. 4,367,924 and Japanese Patent Laid-Open Application No. 107216/1981). The ferroelectric liquid crystal generally shows a chiral smectic C phase (SmC*) or H phase (SmH*) in a specific temperature range and, in this state, shows bistability, i.e., a property of assuming either a first optically stable state (first stable orientation) or a second optically stable state (second stable orientation) in response to an electric field applied thereto and retaining the resultant state in the absence of an electric field. The ferroelectric liquid crystal device further shows a high response speed in response to a change in the electric field and is thus expected to be widely used as a high response speed display device of the memory type.

However, in order for a bistable ferroelectric liquid crystal device to show desired characteristics, it is necessary to design the spacing between a pair of base plates constituting the cell to be 3 μm or less, and there is another problem that the tilt angle used for the memory is not generally the maximum tilt angle.

SUMMARY OF THE INVENTION

A principal object of the present invention is to provide a liquid crystal optical device capable of solving the above mentioned problems.

A specific object of the present invention is to provide a liquid crystal optical device which can be designed to provide a large spacing between a pair of parallel base plates and can be brought to a memory state with a tilt angle of substantially the same order as the maximum tilt angle.

According to the present invention, there is provided a liquid crystal optical device, comprising: (a) a liquid crystal cell comprising a pair of base plates, and a ferroelectric smectic liquid crystal having a negative dielectric anisotropy, (b) means for applying to the ferroelectric liquid crystal an alternating electric field capable of forming at least two stable orientation states including a first stable orientation state and a second stable orientation state, (c) means for changing the frequency or voltage value of the alternating electric field corresponding to a temperature change, (d) means for selectively applying a first electric field for orienting the ferroelectric liquid crystal to the first stable orientation state and a second electric field for orienting the ferroelectric liquid crystal to the second stable orientation state, and (e) means for detecting an optical difference between light rays having passed through the ferroelectric liquid crystal oriented to the first orientation state and light rays having passed through the ferroelectric liquid crystal oriented to the second orientation state.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 3A is a schematic plan view showing an electrode arrangement of a liquid crystal device according to the present invention;

FIG. 3B(a-d) illustrates signals applied to scanning lines and data lines.

FIG. 5(a-d) illustrates signal waveforms applied to scanning lines and data lines; and FIGS. 6 and 7 are block diagrams showing examples of a driving circuit used in the liquid crystal device according to the present invention.

DETAILED DESCRIPTION OF PREFERRED EMBODIMENTS

According to our experiments, it has been found possible to form at least two stable orientation states including a first stable orientation state and a second stable orientation state in a ferroelectric smectic liquid crystal having a negative dielectric anisotropy ($\Delta\epsilon<0$) by applying a high frequency alternating electric field to the ferroelectric liquid crystal. While this method has the advantage that the liquid crystal layer need not be set to a particular thickness, it has the disadvantage that the stable orientation states of the ferroelectric smectic liquid crystal provided under the application of a high frequency alternating electric field are lost due to a change in temperature generated by applying the alternating electric field.

The present invention will be explained in further detail with reference to the accompanying drawings.

Liquid crystals adapted for use in the present invention are chiral smectic liquid crystals having ferroelectricity. More specifically, liquid crystals in chiral smectic C phase (SmC*), chiral smectic G phase (SmG*), chiral smectic F phase (SmF*), chiral smectic I phase (SmI*) or chiral smectic H phase (SmH*), may be used.

Details of ferroelectric liquid crystals are described in, e.g., "LE JOURNAL DE PHYSIQUE LETTERS" 36 (L-69) 1975, "Ferroelectric Liquid Crystals"; "Applied Physics Letters" 36 (11) 1980 "Submicrosecond Bistable Electrooptic Switching in Liquid Crystals"; Kotai Butsuri (Solid State Physics) 16 (141), 1981 "Liquid Crystals", etc. In the present invention, ferroelectric liquid crystals having a negative dielectric anisotropy among those disclosed in these publications may be used.

Particularly preferred ferroelectric liquid crystals may be those showing cholesteric phase on a higher temperature side, including phenyl ester-type liquid crystals shown in the Examples described hereinafter.

When a device is constituted by using these materials, the device may be supported as desired with a block of copper, etc., in which a heater is embedded in order to realize a temperature condition where the liquid crystal compound assumes a desired phase.

Figure 1:
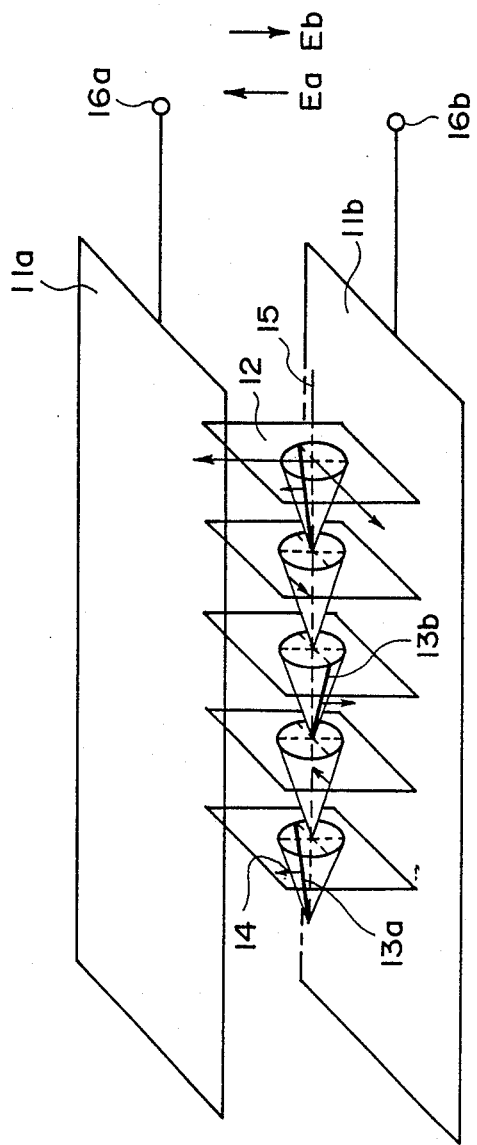
FIG. 1 is a schematic perspective view illustrating the basic operating principle of a liquid crystal device using a chiral smectic liquid crystal.

Referring to FIG. 1, there is schematically shown an example of a ferroelectric liquid crystal cell for explanation of the operation thereof. Hereinbelow, SmC* is taken as a desired phase. Reference numerals 11a and 11b denote base plates (glass plates) on which a transparent electrode of, e.g., $In_2O_3$, $SnO_2$, ITO (Indium-tin-oxide), etc., is disposed respectively. A liquid crystal of SmC* phase in which liquid crystal molecular layers 12 are oriented perpendicular to surfaces of the glass plates is hermetically disposed therebetween. Full lines 13 (13a, 13b, . . . ) show liquid crystal molecules, which successively form spirals with axes 15 extending in parallel with the faces of the base plates 11a and 11b. The angle between a spiral axis and a liquid crystal molecule is defined as a tilt angle. Each liquid crystal molecule 13 has a dipole moment ($P_\perp$) 14 in a direction perpendicular to the extension thereof. When a voltage Ea higher than a certain threshold level is applied between electrodes formed on the base plates 11a and 11b through terminals 16a and 16b, the spiral structure of the liquid crystal molecules 13 is loosened or unwound to change the alignment direction of respective liquid crystal molecules 13 to that of the liquid crystal molecule 13a so that the dipole moments ($P_\perp$) 14 are all directed in the direction of the electric field. Alternatively, when a voltage Eb above a threshold level in the reverse direction is applied, the spiral structure of liquid crystal molecules 13 are loosened and uniformly oriented to the alignment direction of the liquid crystal molecule 13b so that the dipole moments 14 are all directed in the direction of the reverse electric field Eb. The resultant orientation state formed by the voltage Ea or Eb returns to the alignment state forming the original spiral structure. The liquid crystal molecules 13 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 2A:
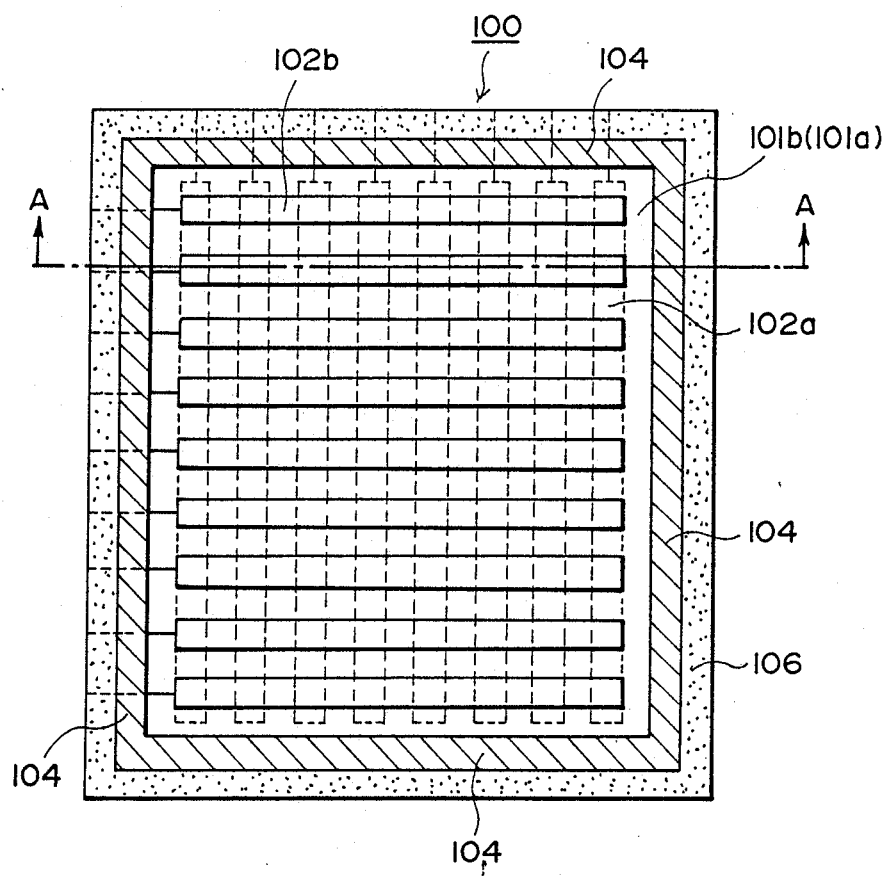
FIG. 2A is a plan view showing an example of the liquid crystal device according to the present invention.
Figure 2B:
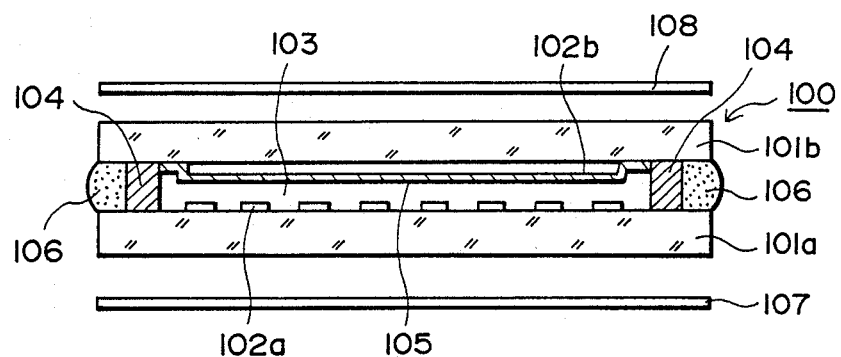
FIG. 2B is a sectional view taken along the line A—A in FIG. 2A.

FIGS. 2A and 2B illustrate an example of the liquid crystal device according to the present invention. FIG. 2A is a plan view of the example and FIG. 2B is a sectional view taken along the line A—A in FIG. 2A.

A cell structure 100 shown in FIGS. 2A and 2B comprises a pair of base plates 101a and 101b made of glass plates or plastic plates which are held with a predetermined gap with spacers 104 and sealed with an adhesive 106 to form a cell structure. On the base plate 101a is further formed an electrode group (e.g., an electrode group for applying scanning voltages of a matrix electrode structure) comprising a plurality of transparent electrodes 102a in a predetermined pattern, e.g., of a stripe pattern. On the base plate 101b is formed another electrode group (e.g., an electrode group for applying signal voltages of the matrix electrode structure) comprising a plurality of transparent electrodes 102b crossing the transparent electrodes 102a.

On the base plate 101b provided with such transparent electrodes 102b may be further formed an orientation controlling film 105 composed of an inorganic insulating material such as silicon monoxide, silicon dioxide, aluminum oxide, titanium oxide, zirconia, magnesium fluoride, cerium oxide, cerium fluoride, silicon nitride, silicon carbide, and boron nitride, or an organic insulating material such as polyvinyl alcohol, polyimide, polyamide-imide, polyester-imide, polyparaxylylene, polyester, polycarbonate, polyvinyl acetal, polyvinyl chloride, polyamide, polystyrene, cellulose resin, melamine resin, urea resin, acrylic resin and a photoresist resin.

The orientation controlling film 105 may be formed by first forming a film of an inorganic insulating material or an organic insulating material as described above and then rubbing the surface thereof in one direction with velvet, cloth, paper, etc.

In another preferred embodiment according to the present invention, the orientation controlling film 105 may be formed as a film of an inorganic insulating material such as SiO or $SiO_2$ on the base plate 101a by the oblique or tilt vapor deposition.

It is preferred that the orientation controlling film 105 is also caused to function as an insulating film. For this purpose, the orientation controlling film may preferably have a thickness in the range of 100 Å to 1μ, especially 500 to 5000 Å. The insulating film also has a function of preventing the occurrence of an electric current which is generally caused due to minor quantities of impurities contained in the liquid crystal layer 103, whereby deterioration of the liquid crystal compounds is prevented even on repeated operations.

In the liquid crystal device according to the present invention, an orientation controlling film similar to that denoted by 105 may also be formed on the other base plate 101a.

The liquid crystal layer 103 in the cell structure 100 shown in FIG. 2 may be formed in, e.g., SmC*. The thickness of the liquid crystal layer 103 is not particularly limited but may preferably be of the order of 3 to 15 μm in general.

On the outsides of the base plates 101a and 101b of the cell structure 100 are disposed polarizers 107 and 108, respectively, in the form of cross nicols, so that optical modulation caused by application of voltages between the electrodes 102a and 102b can be detected by the polarizers 107 and 108.

Now, when a high frequency alternating electric field is applied to the liquid crystal cell in parallel with the liquid crystal molecular layers 12, e.g., perpendicularly to the base plates 11a and 11b (or 101a and 101b), the liquid crystal molecules are oriented to either orientation state obtained by the application of electric field Ea or Eb. The resultant orientations under the application of a high frequency alternating electric field are referred to as a "first stable orientation state" and a "second stable orientation state".

The above phenomenon is caused by the fact that the liquid crystal material has a negative dielectric anisotropy. The frequency of the alternating electric field must be so high that the liquid crystal does not respond to the alternating electric field at a prescribed peak-to-peak voltage.

The alternating voltage may have a frequency of 400 Hz to 100 KHz and a waveform of triangular wave, sine wave, rectangular wave, etc. The voltage may preferably be of the order of 20 to 100 V in terms of Vpp (peak-to-peak voltage) while it somewhat depends on the liquid crystal layer thickness.

According to our experiments, there has been found a tendency that the bistability obtained under the application of an alternating electric field of a certain frequency or voltage is cancelled. In this case, however, it has been found that the bistability can be retained as it is if the frequency or voltage value of the alternating electric field is increased. The amount of change in frequency for this purpose is preferably of the order of 10 to 500 Hz for a 10° C. change, while it depends somewhat on the liquid crystal material, cell thickness and other conditions used. Further, the amount of change in the voltage for this purpose is preferably of the order of 1 to 20 V for a 10° C. change.

Hereinbelow, an example of the driving method used for the liquid crystal optical device according to the present invention will be explained.

Figure 3C:
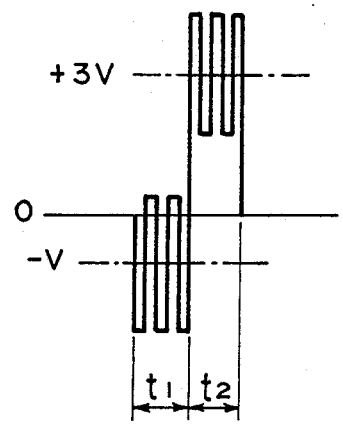
FIG. 3Ca -d illustrates voltage signal waveforms applied to respective picture elements.
Figure 3C:
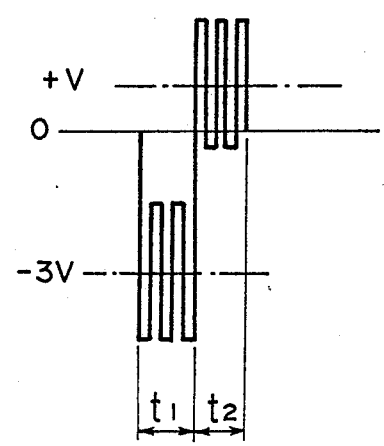
Figure 3C:
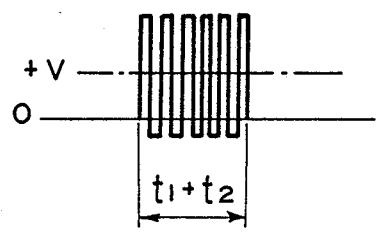
Figure 3C:
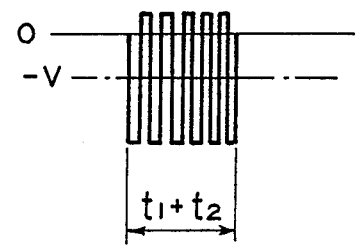

Referring to FIG. 3A, there is schematically shown a matrix electrode arrangement adapted for display. Reference numerals 31 and 32 respectively denote a group of scanning electrodes and a group of information signal electrodes. FIGS. 3B(a) and (b) shows signals applied to the scanning electrodes, wherein FIG. 3B(a) shows a scanning selection signal and FIG. 3B(b) shows a scanning non-selection signal. FIGS. 3B(c) and (d) shows information signals applied to information signal electrodes. They are selectively applied to information signal electrodes respectively depending on writing information inputs. FIG. 3C shows voltage waveforms applied to picture elements by using the electric signals shown in FIG. 3B. FIGS. 3C(a) and (b) show voltage waveforms applied to picture elements on a scanning line to which a scanning selection signal is applied, and FIGS. 3C(c) and (d) show voltage waveforms applied to picture elements on a scanning line to which no scanning selection signal is applied. The voltages applied to these picture elements are set below a threshold value. Writing signals shown in FIGS. 3B(c) and (d) may be selectively applied in phase with a scanning selection signal to sequentially effect writing for each scanning line. The voltages applied to picture elements after the writing on a selected scanning line are set below a threshold value as shown in FIGS. 3C(c) and (d), so that the written states on a scanned line are held or placed in memory for a period of one frame or one field.

Figure 4A:
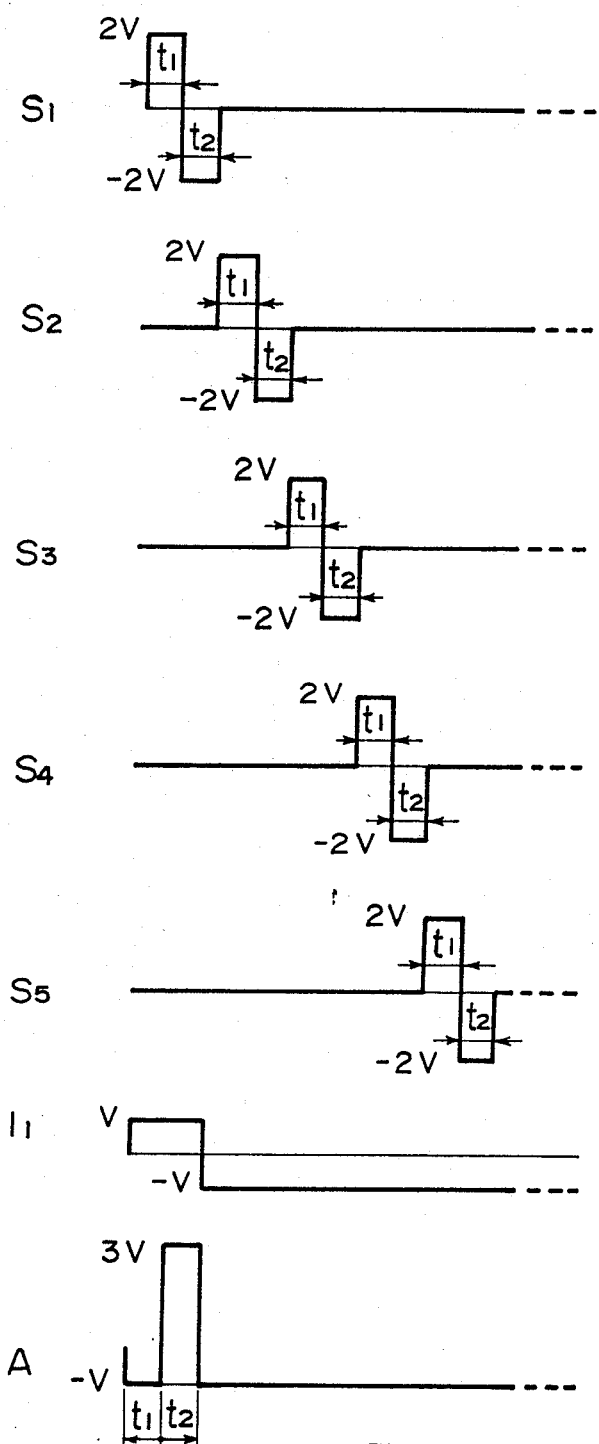
FIG. 4A($S_1$-$S_5$, $l_1$, A) illustrates signal waveforms shown in FIGS. 3B and 3C in time series.

FIG. 4A shows time serial signals obtained by applying signals in order to obtain a display state shown in FIG. 3A. In FIG. 4A, high frequency alternating current components provided by superposition on information signals are not shown.

Figure 4B:
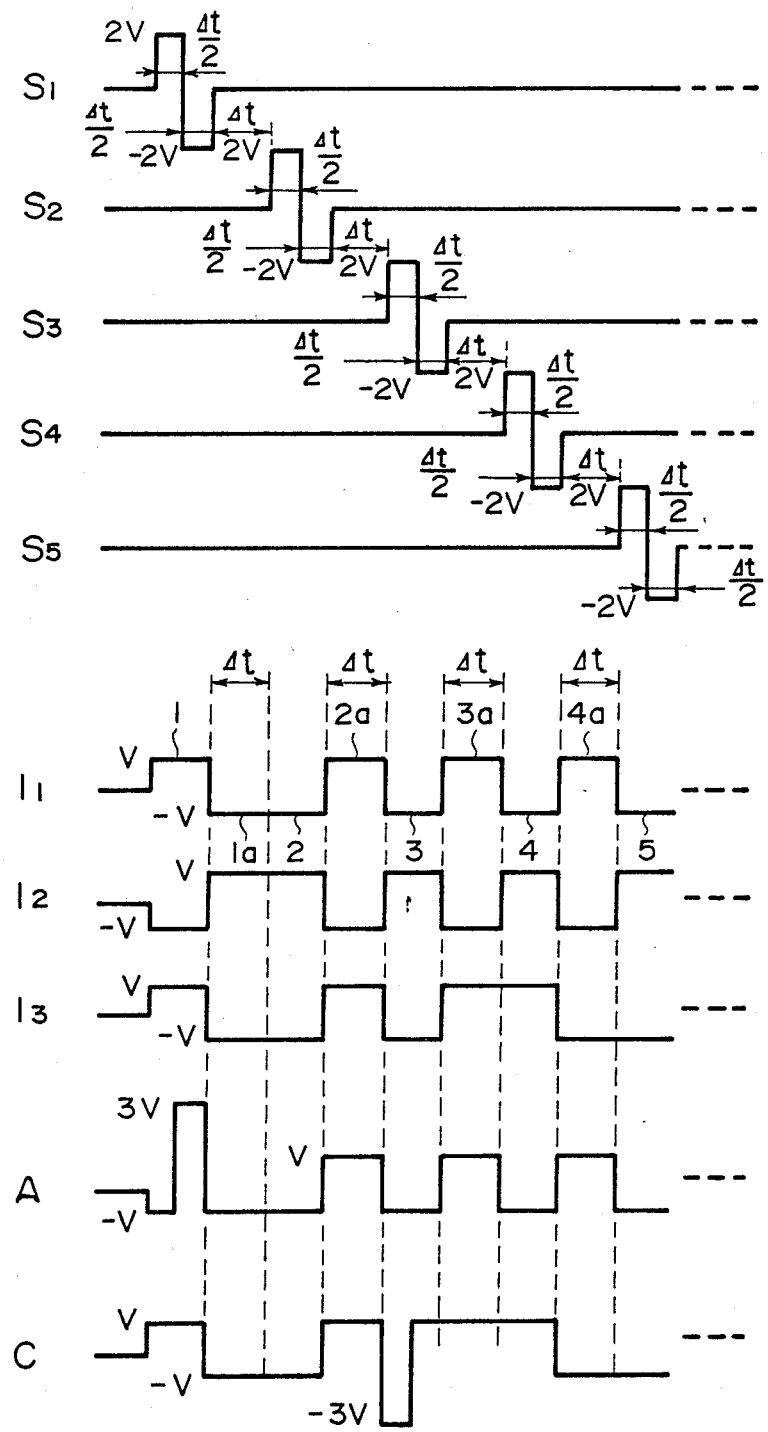
FIG. 4B illustrates another example of time serial signals.

FIG. 4B shows an example of time serial signals wherein an auxiliary signal is provided in phase Δt for preventing crosstalk.

As another embodiment, it is also possible to apply high frequency alternating current components to scanning electrodes. Further, it is also possible to apply high-frequency alternating components to both scanning electrodes and signal electrodes in phase with each other, whereby required withstand voltages of terminal driver ICs for the scanning electrodes and signal electrodes can be lowered.

FIG. 5 shows still another embodiment.

In this embodiment, an alternating signal is applied as a scanning non-selection signal while the scanning selection signal may be in the same waveform as the one shown in FIG. 3B(a). For selection, the high frequency signal is cut off so that the liquid crystal molecules are placed in a readily mobile state and the switching is made easier. Further, by obviating superposition of a selection signal (a: low frequency component) and a non-selection signal (b: high frequency component), an advantage of lowering the withstand voltage of scanning side driver ICs can be attained.

Figure 6:
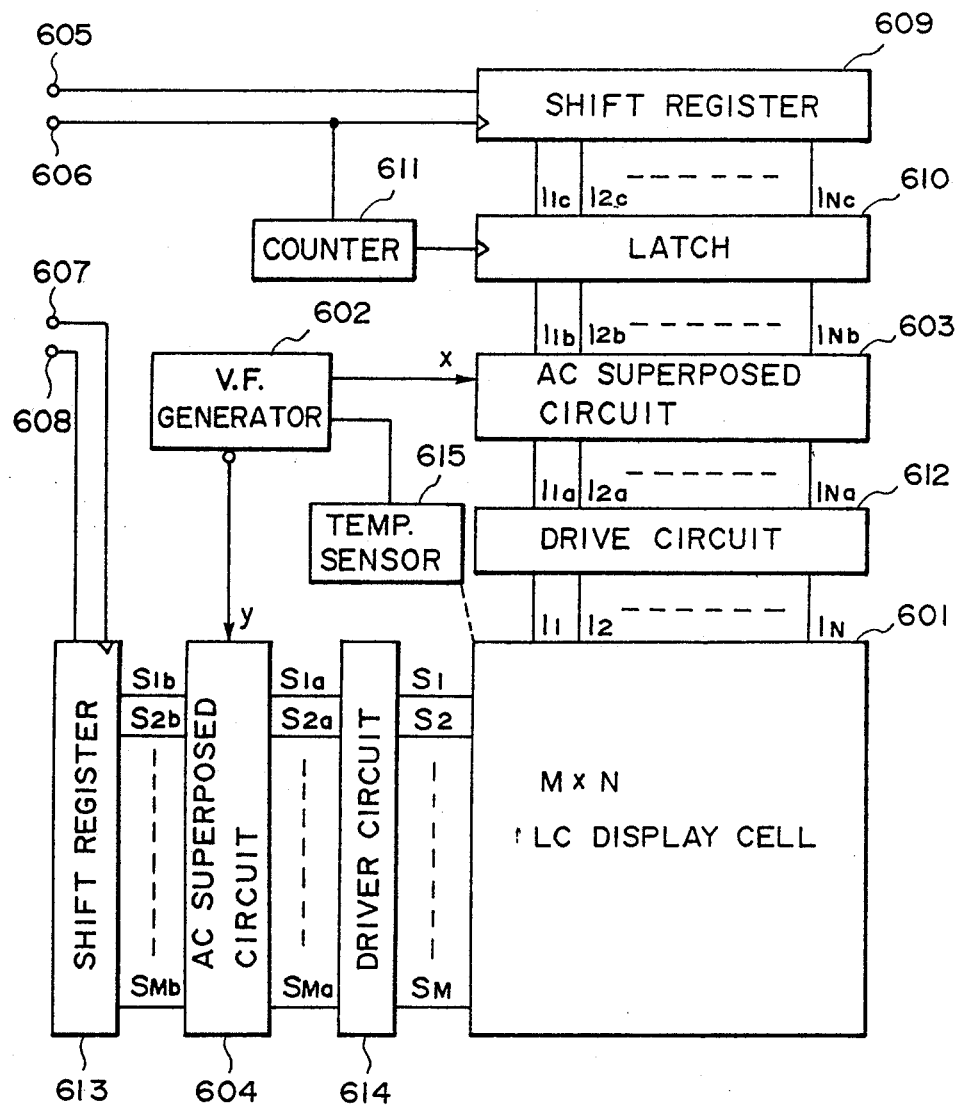

FIG. 6 is a block diagram of a driving circuit for driving an M×N dot liquid crystal display panel using the liquid crystal device according to the present invention. The driving circuit includes a variable frequency generator circuit 602 of which the x and y outputs are shifted from each other by 180° in phase. The x output is applied to an AC superposed circuit for data signal input, while the y output is applied to an AC superposed circuit. Information signals are supplied through a terminal 605 to a shift register 609 controlled by clock pulses applied through a terminal 605. Scanning timing signals are applied through a terminal 607 to a shift register 613 controlled by clock pulses applied through a terminal 608.

The AC superposed circuit 603 on the data signal input side has the function of producing the following outputs:

$$I_{1a} = I_{1b} \oplus x$$

$$I_{2a} = I_{2b} \oplus x$$

$$\vdots$$

$$I_{Na} = I_{Nb} \oplus x$$

wherein $\oplus$ denotes addition, $I_a$, $I_b$ and x refer to voltage values and N denotes the number of data lines. On the other hand, the AC superposed circuit 604 has the function of producing the following outputs:

$$S_{1a} = S_{1b} \oplus y$$

$$S_{2a} = S_{2b} \oplus y$$

$$\vdots$$

$$S_{Ma} = S_{Mb} \oplus y,$$

wherein Sa, Sb and y refer to voltage values, and M denotes the number of scanning lines. On the data signal side, information input signals are successively supplied from a terminal 605 to a shift register 609, a latch 610 controlled by clock pulses 606 and a counter 611, the above mentioned AC superposed circuit 603 and a driver circuit 612 so that signals are sent to N data lines. On the scanning signal side, timing inputs 607 for the scanning lines and clock pulse inputs 608 are supplied to a shift register 613, of which output signals are successively sent to the above mentioned AC superposed circuit 604 and a driver circuit 614 so that scanning signals are sent to M scanning lines.

Further, the temperature around the liquid crystal display cell 601 is detected by a temperature sensor 615 and the output thereof is sent to a variable frequency generator circuit 602. Therefore, by controlling the frequencies of the AC signals superposed on the data signals and scanning signals depending on the temperature, the required bistability is retained even when a temperature change occurs. Either one of the AC superposed circuit 603 on the data line side and the AC superposed circuit 604 on the scanning line side can be omitted. In any case, the bistability is stably retained against a temperature change.

FIG. 7 is a block diagram of another example of driving circuit for driving an M×N dot liquid crystal display panel using the liquid crystal device according to the present invention. The driving circuit includes an AC generator circuit 702 (the output thereof being sent to an AC superposed circuit 707 on the data signal side), an information input terminal 703, a clock pulse input terminal 704 therefore, a timing input terminal 705, a clock pulse input terminal 706 therefor, an AC superposed circuit 707 on the data signal input side, and an AC superposed circuit 708 on the scanning signal input side. The AC superposed circuits 707 and 708 have the same functions as those of the above mentioned AC superposed circuits 603 and 604, respectively, explained with reference to FIG. 6.

On the data signal side, information input signals are successively supplied from a terminal 703 to a shift register 709, a latch 710 controlled by clock pulses 704 and a counter 711, the above mentioned AC superposed circuit 707 and a driver circuit 712 so that signals are supplied to N data lines. On the scanning signal side, timing inputs 705 for the scanning lines and clock pulse inputs 708 are supplied to a shift register 713, of which output signals are successively sent to the above mentioned AC superposed circuit 708 and a driver circuit 714 so that scanning signals are sent to M scanning lines.

Further, the temperature around the liquid crystal display cell 701 is detected by a temperature sensor 715 and the output thereof is sent to a phase converter 702. Therefore, by controlling the phases of the AC signals superposed on the data signals and scanning signals depending on the temperature so as to change the effectively applied voltages of the AC signals, whereby the required bistability is stably retained against a possible temperature range.

Hereinbelow, the present invention will be explained with reference to specific examples.

EXAMPLE 1

A liquid crystal device having an electrode arrangement as shown in FIG. 3 was prepared. The base plates were glass plates, on which 1000 Å-thick transparent stripe electrodes were formed and covered with surface-rubbed polyimide films. The thus treated two glass plates were secured to each other with 10 μm-high polyimide spacers therebetween so as to retain a spacing therebetween, and the periphery thereof was sealed with an epoxy resin to prepare a blank cell.

Into the cell, the following mixture ferroelectric liquid crystal having a negative dielectric anisotropy was injected under the isotropic phase.

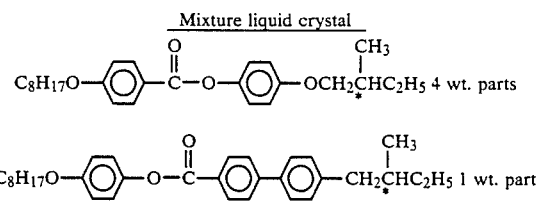

The mixture liquid crystal shows the following phase transition characteristic:

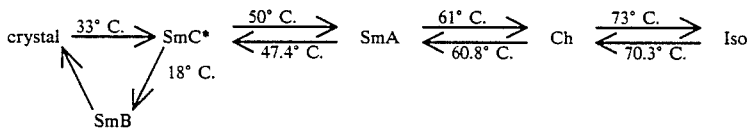

Herein, SmC* means chiral smectic C phase; SmA, smectic A phase; Ch, cholesteric phase; and Iso, isotropic phase. The phase transition temperatures are values measured by means of a DSC (differential scanning calorimeter).

Then, the injection port was sealed, and the liquid crystal was gradually cooled from isotropic phase to SmC* at a rate of 0.5° C./hr. When the thus prepared liquid crystal device was sandwiched between polarizers crossing at right angles and observed through a microscope, a monodomain was confirmed to be formed over a wide area and the spiral pitch of SmC* was observed.

The liquid crystal device was incorporated in a driving circuit as shown in FIG. 6 except that the AC superposed circuit 604 on the scanning line side was omitted. A display operation was carried out by using switching pulses as shown in FIG. 3B and a superposed high frequency alternating electric field of 10 KHz and 60 volts (Vpp). More specifically, the conditions of $t_1+t_2=2$ msec ($t_1=t_2$), and V=21.5 volts, were used.

The variable frequency generator circuit 602 was so controlled that the frequency was increased at a rate of 5% per 1° C. increase with 10° C. as the reference temperature. As a result, good display states were obtained even when the temperature varied in the range of 10° C. to 30° C. This means that a sufficient bistability condition was retained against a temperature change in the range of 10° C. to 30° C.

In contrast thereto, when the above mentioned display operation was repeated except that the use of the variable frequency generator circuit was omitted, a sufficient display characteristic could not be obtained on a higher temperature side under the temperature change in the range of 10° C. to 30° C. This means that the bistable orientation state could not be satisfactorily formed on the higher temperature side.

EXAMPLE 2

A liquid crystal device was prepared in quite the same manner as in Example 1 except that the 10 μm-polyimide spacers were replaced by 7 μm-polyimide spacers. In the liquid crystal device, a monodomain was formed over a wide area, whereas in contrast with the one of Example 1, the spiral pitch of SmC* was not observed (i.e., the state of the spiral structure had been loosened was formed), and the bistability state was not observed in the absence of an electric field.

When this liquid crystal device was incorporated in the driving circuit to effect a display in the same manner as in Example 1 except that the Vpp of the alternating electric field was changed to 42 volts, the bistability condition was stably retained against a temperature change similarly as in Example 1.

EXAMPLE 3

The liquid crystal device prepared in Example 1 was incorporated in a driving circuit as shown in FIG. 7 and driven by using the switching pulses and high frequency alternating electric field as used in Example 1.

The phase converter 702 was so controlled that the AC voltage was increased at a rate of 1% per 1° C. increase with 30° C. as the reference temperature. As a result, good display states were obtained even when the temperature was changed in the range of 10° C. to 30° C. This means that a sufficient bistability condition was retained against a temperature change in the range of 10° C. to 30° C.

In contrast thereto, when the above mentioned display operation was repeated except that the use of the phase converter was omitted, a sufficient display characteristic could not be obtained on a lower temperature side under the temperature change in the range of 10° C. to 30° C. This means that the bistable orientation state could not be satisfactorily formed on the lower temperature side.

EXAMPLE 4

The liquid crystal device prepared in Example 2 was incorporated in the driving circuit as shown in FIG. 7 and driven in the same manner as in Example 3, whereby it was found that the bistability condition was stably retained against a temperature change.

As explained hereinabove, according to the present invention, the bistability condition required for effective operation of a ferroelectric liquid crystal is stably retained even when the environmental temperature varies, whereby good display characteristic can be obtained without depending on a temperature change.

What is claimed is:

1. A liquid crystal optical device, comprising:
 (a) a liquid crystal cell comprising a matrix electrode structure composed of a first group of electrodes and a second group of electrodes intersecting the first group of electrodes with a ferroelectric smectic liquid crystal having a negative dielectric anisotropy disposed between the first and second groups of electrodes;
 (b) means for applying a scanning selection signal to at least one electrode of the first group of electrodes and a scanning nonselection signal to at least one of the other of the first group of electrodes;
 (c) means for applying information signals in parallel to the second group of electrodes, said information signals being repeated alternating electric fields: such that repeated alternating electric fields are applied to at least some intersections of the first group of electrodes and the second group of electrodes so as to place the ferroelectric smectic liquid crystal in a bistable memory orientation state with an increased tilt angle;
 (d) means for raising the frequency of the alternating electric field in accordance with a temperature increase in said liquid crystal cell; and
 (e) means for detecting an optical difference between light rays which have passed through the ferroelectric smectic liquid crystal oriented to a plurality of different orientation states.

2. A liquid crystal optical device according to claim 1, wherein said means for detecting an optical difference is a polarizer having a polarization axis substantially in parallel with the molecular axis of the ferroelectric liquid crystal oriented to one of the plurality of different orientation states.

3. A liquid crystal optical device according to claim 1, wherein said means for detecting an optical difference comprises a pair of polarizers arranged in the form of cross nicols, one of the pair of polarizers having a polarization axis substantially parallel with the molecular axis of the ferroelectric liquid crystal oriented to one of the plurality of different orientation states.

4. A liquid crystal optical device according to claim 1, wherein said ferroelectric smectic liquid crystal is in chiral smectic C phase, H phase, I phase, G phase or F phase.

5. A liquid crystal optical device according to claim 1, wherein the frequency of said alternating electric field is in the range of 400 Hz to 100 KHz.

6. A liquid crystal optical device according to claim 1, wherein said alternating electric field is applied from the second group of electrodes to the intersections of the first group of electrodes and the second group of electrodes when said first group of electrodes are supplied with the scanning nonselection signal.

7. A liquid crystal optical device according to claim 1, wherein said alternating electric field is applied from the first group of electrodes to the intersections between the first group of electrodes and the second group of electrodes when said first group of electrodes are supplied with the scanning nonselection signal.

8. A liquid crystal optical device according to claim 1, wherein said means for raising the frequency of the alternating electric field corresponding to a temperature increase, comprises a temperature sensor and a variable frequency generator circuit.

9. A liquid crystal optical device according to claim 1, wherein said ferroelectric smectic liquid crystal shows cholesteric phase on a higher temperature side than the smectic phase.

10. A liquid crystal optical device according to claim 1, wherein the molecules of said ferroelectric smectic liquid crystal are arranged to form a spiral structure in absence of an electric field.

11. A liquid crystal optical device according to claim 1, wherein the molecules of said ferroelectric smectic liquid crystal are in an alignment state wherein the spiral structure is not formed in the absence of an electric field.

* * * * *